(12) United States Patent  
Seo

(10) Patent No.: US 10,018,999 B2  
(45) Date of Patent: Jul. 10, 2018

(54) SYSTEM AND METHOD FOR MEASURING A HEALTH INDEX OF A PLANT

(71) Applicant: BNF TECHNOLOGY INC., Daejeon (KR)

(72) Inventor: Ho Joon Seo, Daejeon (KR)

(73) Assignee: BNF TECHNOLOGY INC., Daejeon (KR)

(*) Notice: Subject to any disclaimer, the term of this patent is extended or adjusted under 35 U.S.C. 154(b) by 0 days.

(21) Appl. No.: 15/245,444

(22) Filed: Aug. 24, 2016

(65) Prior Publication Data

US 2016/0363928 A1 Dec. 15, 2016

Related U.S. Application Data

(63) Continuation-in-part of application No. 13/988,964, filed as application No. PCT/KR2012/004059 on May 23, 2012, now abandoned.

(30) Foreign Application Priority Data

Sep. 9, 2011 (KR) ........................ 10-2011-0092080

(51) Int. Cl.
*G05B 23/02* (2006.01)
*F01K 13/00* (2006.01)

(52) U.S. Cl.
CPC ........ *G05B 23/0221* (2013.01); *F01K 13/003* (2013.01); *G05B 23/0251* (2013.01); *G05B 23/0283* (2013.01); *G05B 2219/24019* (2013.01); *G05B 2219/32234* (2013.01)

(58) Field of Classification Search
CPC ............ G05B 23/0221; G05B 23/0251; G05B 23/0283; G05B 2219/24019; G05B 2219/32234; F01K 13/003
See application file for complete search history.

(56) References Cited

U.S. PATENT DOCUMENTS

| 2002/0147506 | A1  | 10/2002 | Eryurek et al. |
|---|---|---|---|
| 2005/0007249 | A1* | 1/2005 | Eryurek ............... G05B 23/027 340/511 |
| 2010/0241246 | A1  | 9/2010 | Taruishi et al. |
| 2012/0022912 | A1  | 1/2012 | Kim |

FOREIGN PATENT DOCUMENTS

| JP | 2001-067103 A | 3/2001 |
|---|---|---|
| JP | 2002-073155 A | 3/2002 |
| JP | 2002-358120 A | 12/2002 |
| KR | 10-2004-0004664 A | 1/2004 |
| KR | 10-2009-0021697 A | 3/2009 |

* cited by examiner

*Primary Examiner* — Bryan Bui

(74) *Attorney, Agent, or Firm* — Rabin & Berdo, P.C.

(57) ABSTRACT

Disclosed is a system and method for measuring a health index of a plant in which a condition of a lower level component is reflected. The actual measurement values of lower level components are reflected to the health index such that, when an actual measurement value of a certain component deviates from a normal range, if the deviation is less likely to trip the plant, the actual measurement value of the component has a minimal influence on the health index. The condition of the plant can be more easily and conveniently monitored based on only the health index of the uppermost level layer.

10 Claims, 7 Drawing Sheets

SYSTEM AND METHOD FOR MEASURING A HEALTH INDEX OF A PLANT

CROSS REFERENCE TO RELATED APPLICATIONS

This application is a continuation-in-part application of co-pending U.S. application Ser. No. 13/988,964, filed May 22, 2013, the disclosure of which is incorporated herein by reference. This application claims priority benefits under 35 U.S.C. § 1.119 to Korean Patent Application No. 10-2011-0092080 filed Sep. 9, 2011.

TECHNICAL FIELD

The present invention relates to a system and method for measuring a health index of a plant and, more particularly, to a system and method for measuring a health index of a plant in which a condition of a lower level component is reflected. According to the present invention, the condition of the plant can be more easily and conveniently monitored based on the health index of the uppermost level layer. For example, when an actual measurement value of a certain component of a certain lower level layer deviates from a normal range, the actual measurement value is reflected in the health index. For another example, when the actual measurement value of a specific component is less likely to trip the plant, although the actual measurement value of the component momentarily deviates from the normal range, the actual measurement value of the component is minimally reflected in the health index.

BACKGROUND ART

A plant 10 in a tree structure may include components which constitute various levels from a lower level to a higher level, and the uppermost level layer of the tree structure of the plant 10 can be selected as needed by a user.

For example, as shown in FIG. 1, a boiler (BOILER) and a turbine (TURBINE) may be disposed at the uppermost level layer (LEVEL 1). A lower level layer of the boiler may include a draft system (DRAF-SYS), a furnace system (FURNACE), a fuel system (FUEL & FIRING), and a desulfurization system (FGD & EP), etc. (LEVEL 2). And a lower level layer of the draft system (DRAF-SYS) may include a forced draft fan (FD FAN), an induced draft fan (ID FAN), a primary air fan (PA FAN), and GAH (LEVEL 3). The forced draft fan (FD FAN) may include a forced draft fan A (FD FAN-A) and a forced draft fan B (FD FAN-B) (LEVEL 4), and a lower level layer of the forced draft fan A (FD FAN-A) may include primary air fan pressure (FDFA-INOUT PR), forced draft fan temperature (FDFA-INOUT TEMP), forced draft fan air flow (FDFA-AIR FLOW), a forced draft fan bearing (FDFA-BRG&WIND), and forced draft fan vibration (FDFA-VIBRATION) (LEVEL 5). In addition, a lower level layer of the primary air fan pressure (FDFA-INOUT PR) may include SPECIFIC ENERGY #1 FD, FDF-A SUCTION-PRESSURE, FDF-A IN PRESS ABS, FDF-A IN PRESS ABS, FDF-A OUT PRESS, and FDF-A INNET PRESS.

Generally, to measure a health index of the boiler (BOILER) which is disposed in the uppermost level layer, an actual measurement value of the lowermost level component is measured and then the health index of the next upper level layer is calculated without correction of the actual measurement value of the lowermost level component. This process is repeated to calculate the health index of the uppermost level layer.

According to this method, however, even when an actual measurement value of a critical component of the lowermost level layer or the upper level layer deviates from a normal range, the health index of the uppermost level layer is calculated as in a normal state, because their severity or importance becomes lowered while the actual measurement value of the critical component is transmitted to the upper level layer. In other words, the conventional health index calculation method is less reliable because of distortion of the health index.

And the distorted index may result in missing the timing for repairing, inspecting and replacing the components having abnormal value, and as a consequence, the entire plant may be shut down (trip), which may lead to a serious damage.

In order to prevent the plant from the occurrence of the above problem, it is required to monitor in real time whether actual measurement values of components of the lowermost level layer as well as the components of upper level layers constituting the plant are within the normal range.

In addition, in certain circumstances, even though some of actual measurement values of components of lower level layers momentarily deviate from the normal range, which does not affect the health index of the uppermost level layer, and vice versa.

Consequently, there has been a high necessity for developing a system and method for monitoring a health index of a plant only by checking a health index of the upper level layer without monitoring whether an actual measurement value of the lower level layer is within a normal range.

DISCLOSURE

Technical Problem

Therefore, the present invention has been made to solve the above mentioned problems, and it is an object of the present invention to provide a system and method for measuring a health index of a plant to which a condition of a lower level component is reflected, whereby a status of the plant is more easily and conveniently monitored only with the health index of the uppermost level layer.

It is another object of the present invention to provide a system and method for measuring a health index of a plant to which a condition of a lower level component is reflected, wherein an actual measurement value is reflected in the health index, when the actual measurement value of a certain component of a certain lower level layer deviates from a normal range.

And it is a further object of the present invention to provide a system and method for measuring a health index of a plant to which a condition of a lower level component is reflected, wherein the actual measurement value of the above component has a minimal influence on the health index, when a change of a specific component is less likely to trip the plant, even if the actual value momentarily deviates from the normal range.

Technical Solution

In according to the present invention, the system for measuring a health index of a plant, comprising: a plant having a tree structure and including a first level layer being a lowest level layer, a second level layer being a higher level layer than the first level layer, the second level layer including a plurality of components; at least one sensor disposed in the plant to collect actual measurement values from the components; a measuring unit connected to the plant via a wire or wireless communication manner and receiving the actual measurement values from the sensor to calculate the health index, the measuring unit including a memory storing data including the actual measurement values and an operation history of the first level layer of the plant, an expected value calculation processor calculating an expected value of each of the components of the first level layer using data in the memory, an index value calculation processor calculating a tag index of said each of the components of the first level layer by comparing the expected value with an actual measurement value of said each of the components, a deviation average calculation processor calculating deviation values between the respective components of the first level layer and calculating a deviation average value by averaging the deviation values, a correction value calculation processor calculating a correction value of said each of the components of the first level layer based on the deviation average value of the components of the first level layer, a tag index average calculation processor calculating an tag index average value of the components of the first level layer by averaging tag indices of the components of the first level layer, an index calculation processor calculating an group index of a component of the second level layer to which the first level layer belongs, wherein the group index of the component of the second level layer is determined by selecting a greater one of: a first value obtained by multiplying the correction value and the tag index average value of the components of the first level layer, and a second value which is the lowest tag index among the tag indices of the components of the first level layer.

Also, in the system of the present invention, the plant further includes a third level layer being a higher level layer than the second level layer, the third level layer including at least one component and the second level layer including a plurality of components, and the deviation average calculation processor calculates the deviation values between the respective components of the second level layer and calculates the deviation average value by averaging the deviation values, the correction value calculation processor calculates the correction value of each of the components of the second level layer based on the deviation average value of the components of the second level layer, the tag index average calculation processor calculates the tag index average value of the components of the second level layer by averaging the tag indices of the components of the second level layer, and the index calculation processor calculates the group index of a component of the third level layer to which the second level layer belongs, wherein the group index of the component of the third level layer is determined by selecting a greater one of: a third value obtained by multiplying the correction value and the tag index average value of the components of the second level layer, and a fourth value being the lowest tag index among the tag indices of the components of the second level layer.

Also, in the system of the present invention, the tag index is calculated by an equation of $$\text{Tag index} = 100 + A - \left( \frac{|\text{expected value} - \text{actual measurement value}|}{\text{normal range of an actual measurement value}} \times B \right),$$

wherein A is a value to correct the deviation from the normal range of the actual measurement value of said each of the components, and B is a value to adjust the reflection rate of the deviation between the expected value and the actual measurement value.

Also, in the system of the present invention, the correction value is calculated by an equation of $$Y = 1.2 - 2\left(\frac{X}{100}\right), \quad 0.1 \leq Y \leq 1,$$

wherein X is the average deviation value of the deviation values, and Y is the correction value.

Also, in the system of the present invention, the tag index is multiplied by a weight, and the weight is determined based on a possibility of trip of the plant by a corresponding component.

According to the present invention, a method of measuring a health index of a plant comprising: collecting actual measurement values from the components by at least one sensor disposed in the plant; receiving the actual measurement values from the sensor by a measuring unit; calculating an expected value of each of the components of the first level layer, by an expected value calculation processor, using data stored in a memory, the data including the actual measurement values and an operation history of the first level layer of the plant; calculating a tag index of said each of the components of the first level layer, by an index value calculation processor, by comparing the expected value with an actual measurement value of said each of the components; calculating, by a deviation average calculation processor, deviation values between the respective components of the first level layer and calculating, by the deviation average calculation processor, an deviation average value by averaging the deviation values; calculating, by a correction value calculation processor, a correction value of said each of the components of the first level layer based on the deviation average value of the components of the first level layer; calculating, by a tag index average calculation processor, an tag index average value of the components of the first level layer by averaging tag indices of the components of the first level layer; calculating, by an index calculation processor, an group index of a component of the second level layer to which the first level layer belongs, wherein the group index of the component of the second level layer is determined by selecting a greater one of: a first value obtained by multiplying the correction value and the tag index average value of the components of the first level layer, and a second value which is the lowest tag index among the tag indices of the components of the first level layer.

Also, the method of the present invention further comprises: calculating, by the deviation average calculation processor, the deviation values between the respective components of the second level layer and calculating the deviation average value by averaging the deviation values; calculating, by the correction value calculation processor, the correction value of said each of the components of the second level layer based on the deviation average value of the components of the second level layer; calculating, by the tag index average calculation processor, the tag index average value of the components of the second level layer by averaging the tag indices of the components of the second level layer; and calculating, by the index calculation processor, the group index of a component of the third level layer to which the second level layer belongs, wherein the group index of the component of the third level layer is determined by selecting a greater one of: a third value obtained by multiplying the correction value and the tag index average value of the components of the second level layer, and a fourth value being the lowest tag index among the tag indices of the components of the second level layer.

Also, in the method of the present invention, the tag index is calculated by an equation of Tag index =

$$100 + A - \left(\frac{|\text{expected value} - \text{actual measurement value}|}{\text{normal range of an actual measurement value}} \times B\right),$$

wherein A is a value to correct the deviation from the normal range of the actual measurement value of said each of the components, and B is a value to adjust the reflection rate of the deviation between the expected value and the actual measurement value.

Also, in the method of the present invention, the correction value is calculated by an equation of $$Y = 1.2 - 2\left(\frac{X}{100}\right), \quad 0.1 \le Y \le 1,$$

wherein X is the average deviation value of the deviation values, and Y is the correction value.

Also, in the method of the present invention, the tag index is multiplied by a weight, and the weight is determined based on a possibility of trip of the plant by a corresponding component.

Advantageous Effects

The system and method for measuring a health index of a plant in which a condition of a lower level component is reflected, can control and manage more efficiently a critical factor of a plant trip. According to the system and method for measuring a health index of a plant in which a condition of a lower level component is reflected, the condition of the entire plant can be monitored easily and conveniently only by monitoring the health index of the topmost level.

In addition, according to the present invention, it has a merit to trip the plant through control and management of the above component, because the actual measurement value is reflected in the health index, when the actual measurement value of a certain component of a certain lower level layer deviates from a normal value.

Furthermore, according to the present invention, when a change of the actual measurement value of a specific component is less likely to trip the plant, the control and management of the plant makes the actual measurement value of the specific component have a minimal influence on the health index, even though the actual measurement value of the specific component deviates temporarily from a normal range.

BEST MODE

Hereinafter, there will be a description for a system and method for measuring a health index of a plant in which a condition of a lower level component is reflected, according to the present invention.

Figure 1:
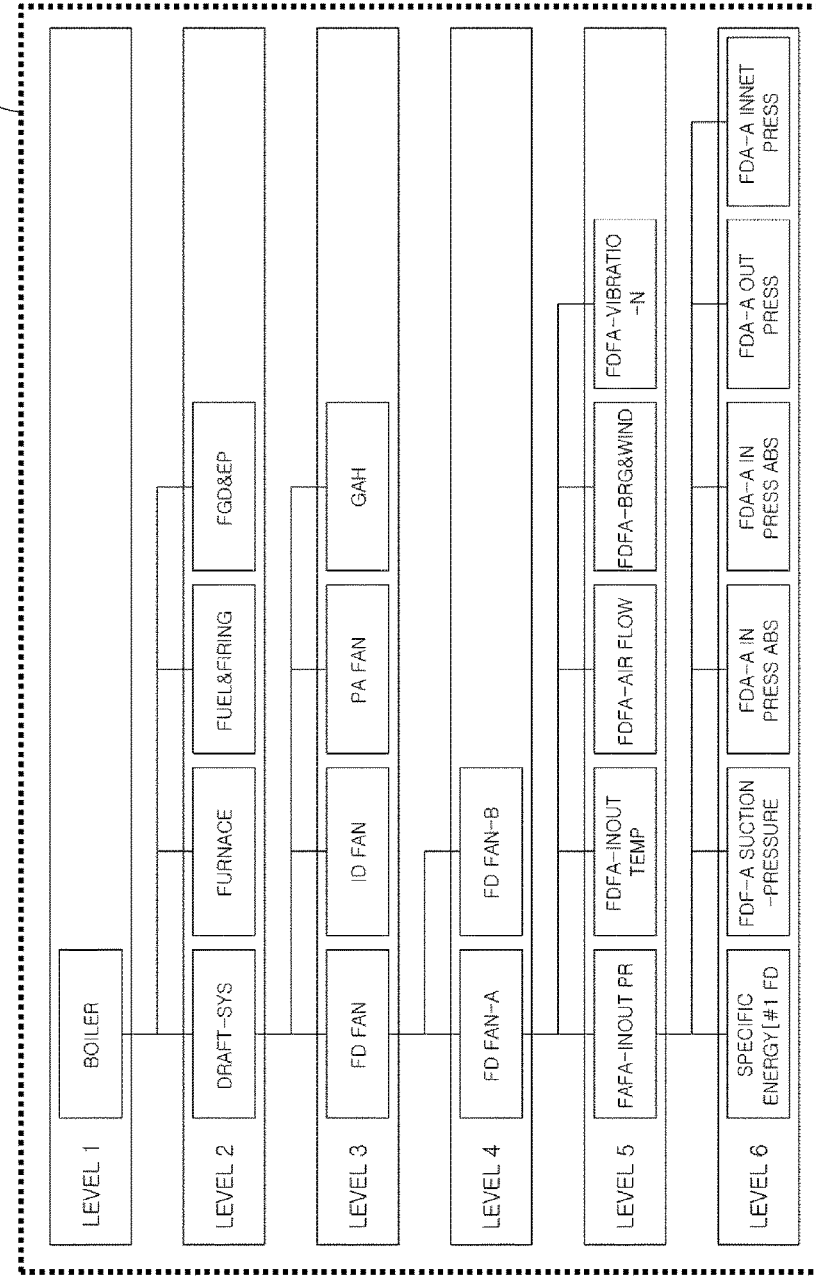
FIG. 1 is a view illustrating an example of a plant having a tree structure.
Figure 2:
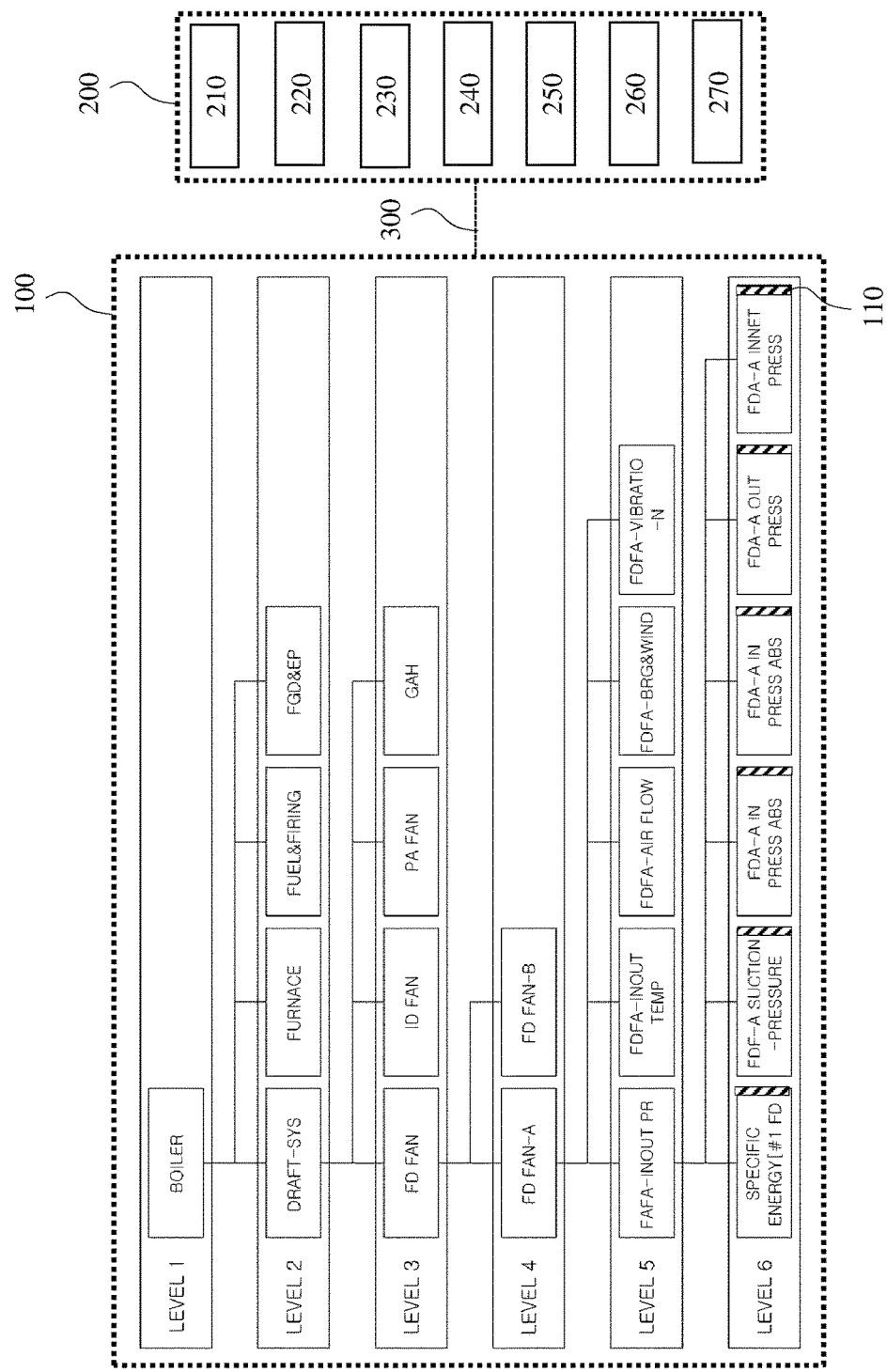
FIG. 2 is a view illustrating an exemplary system for measuring a health index of a plant according to the present invention.

FIG. 2 is a system for measuring a health index of a plant in which a condition of lower level component is reflected according to the present invention. In FIG. 2, the plant 100 includes components which constitute multiple levels and are connected in a tree structure. Here, at least one sensor 110 is provided in the plant to collect data, e.g., an actual measurement value, therefrom and transmit the data to a measuring unit 200. The sensor 110 may be provided in components of a lowermost level (LEVEL 6), or in all components of the plant 100. The measuring unit 200 is provided for receiving the data from the sensors 110 and calculating the health index using the data. The measuring unit 200 is connected to the sensor 110 of the plant 100 via wire or wireless communication manner 300.

The measuring unit 200 includes an expected value calculation processor 210, an index value calculation processor 220, a deviation average calculation processor 230, a correction value calculation processor 240, a tag index average calculation processor 250, an index calculation processor 260, and a memory 270. Wherein, the expected value calculation processor 210, the index value calculation processor 220, the deviation average calculation processor 230, the correction value calculation processor 240, the tag index average calculation processor 250 and an index calculation processor 260 can be provided separately from each other, or in all in one.

Figure 3:
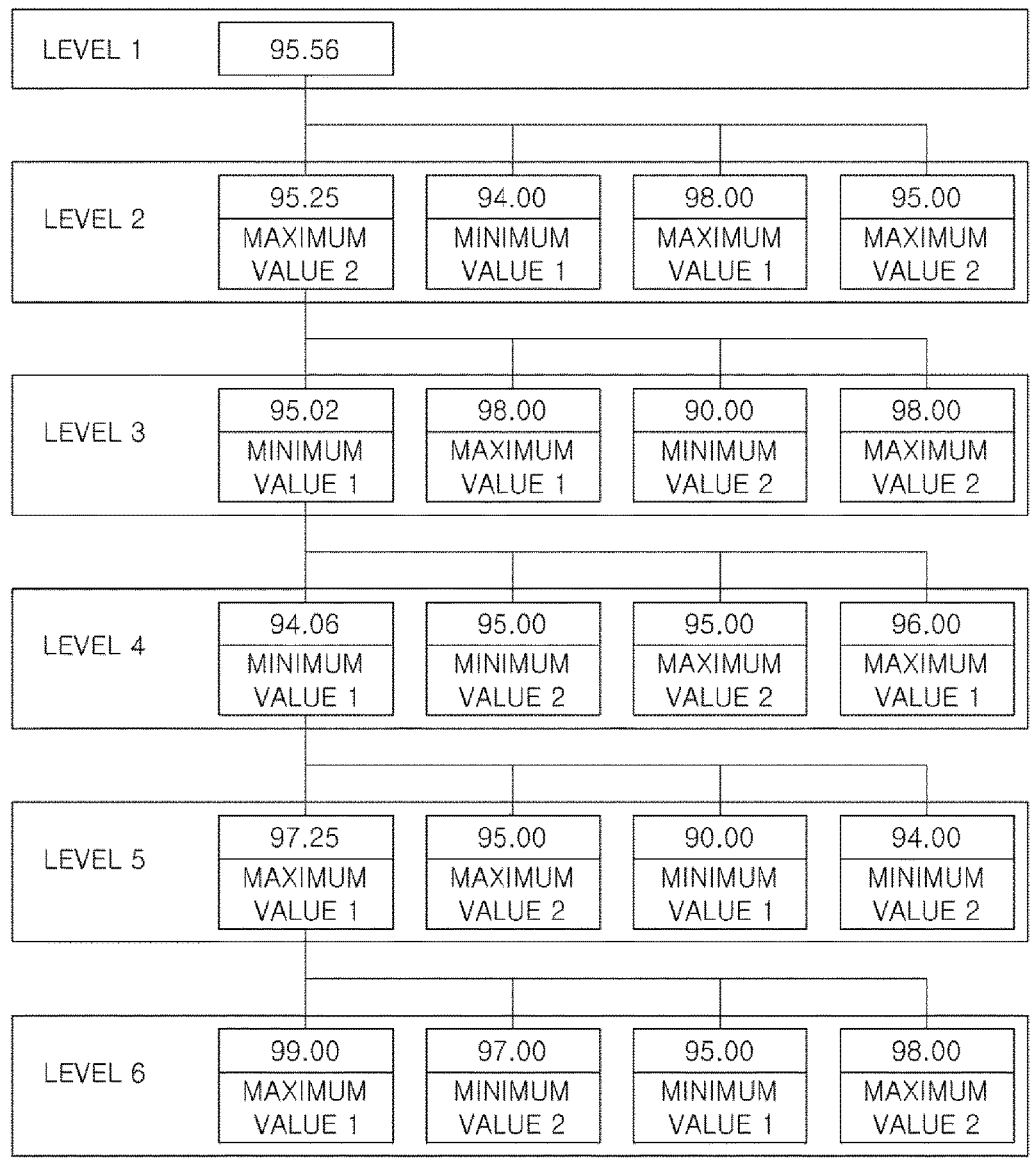
FIG. 3 is a view showing an example illustrating the system and method for measuring the health index of the plant according to the present invention.

FIG. 3 shows a plant in which exemplary indices are provided for illustrating a system and method for measuring a health index of a plant in which a condition of a lower level component is reflected according to the present invention.

Figure 4:
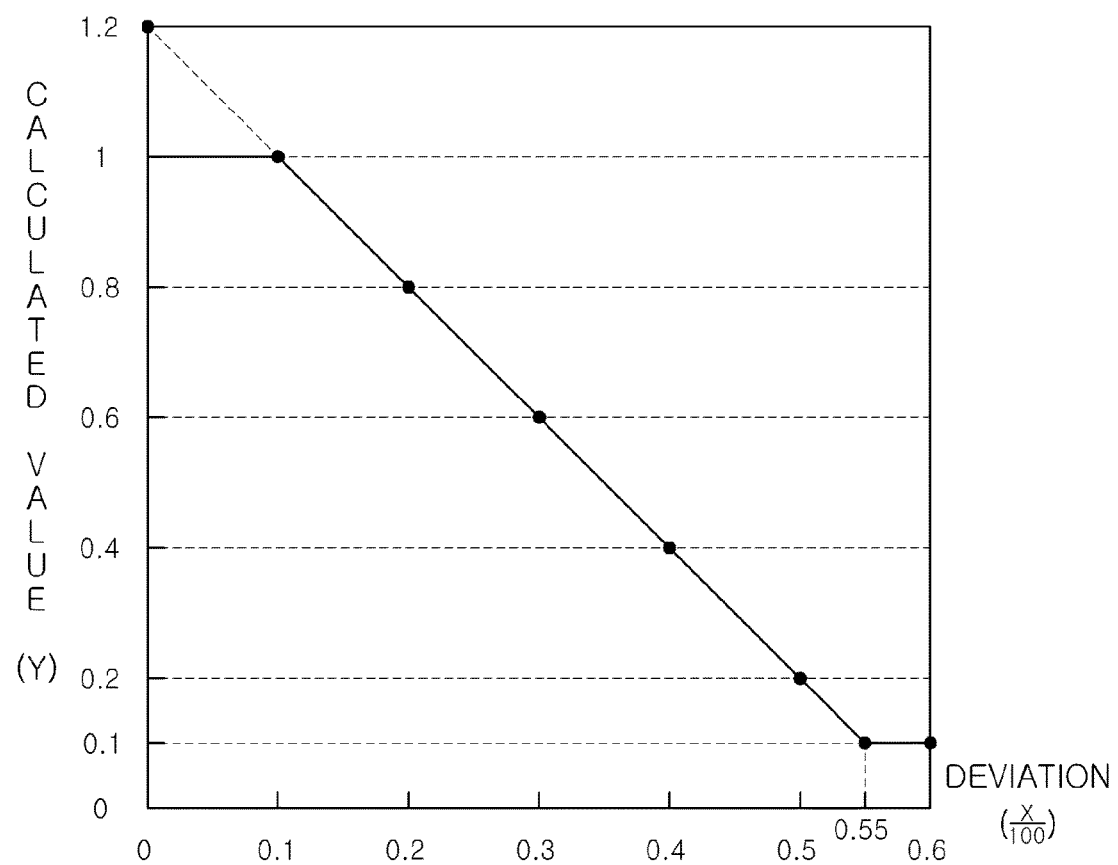
FIG. 4 is a graph illustrating a correction value in the system and method for measuring the health index of the plant according to the present invention.

FIG. 4 is a graph illustrating a correction value in the method for measuring the health index of the plant in which a condition of a lower level component is reflected according to the present invention.

Figure 5:
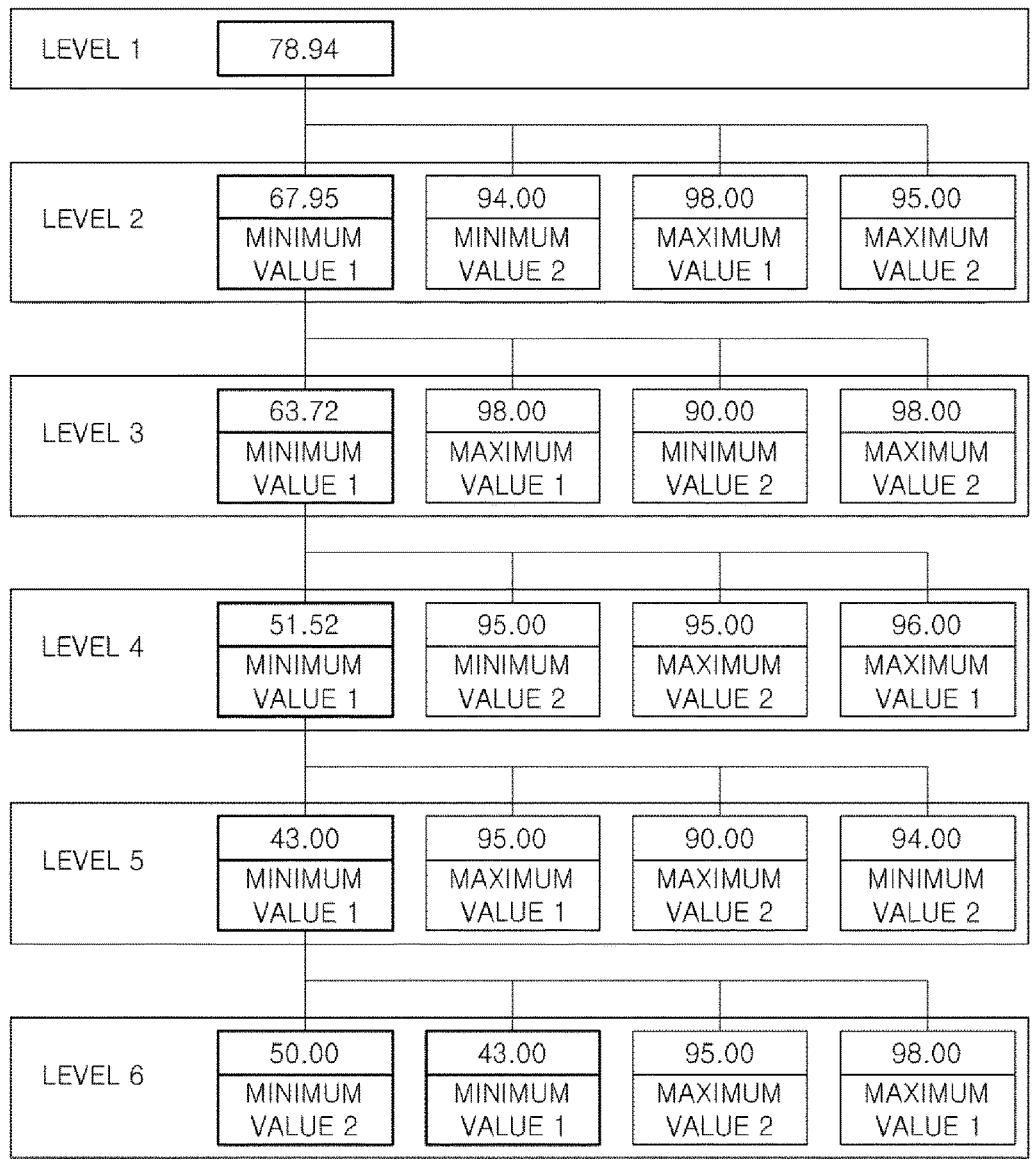
FIG. 5 is a view showing another example illustrating the system and method for measuring the health index of the plant according to the present invention.

FIG. 5 shows a plant in which another exemplary indices are provided for illustrating the system and method for measuring the health index of the plant in which the condition of a lower level component is reflected according to the present invention.

Figure 6:
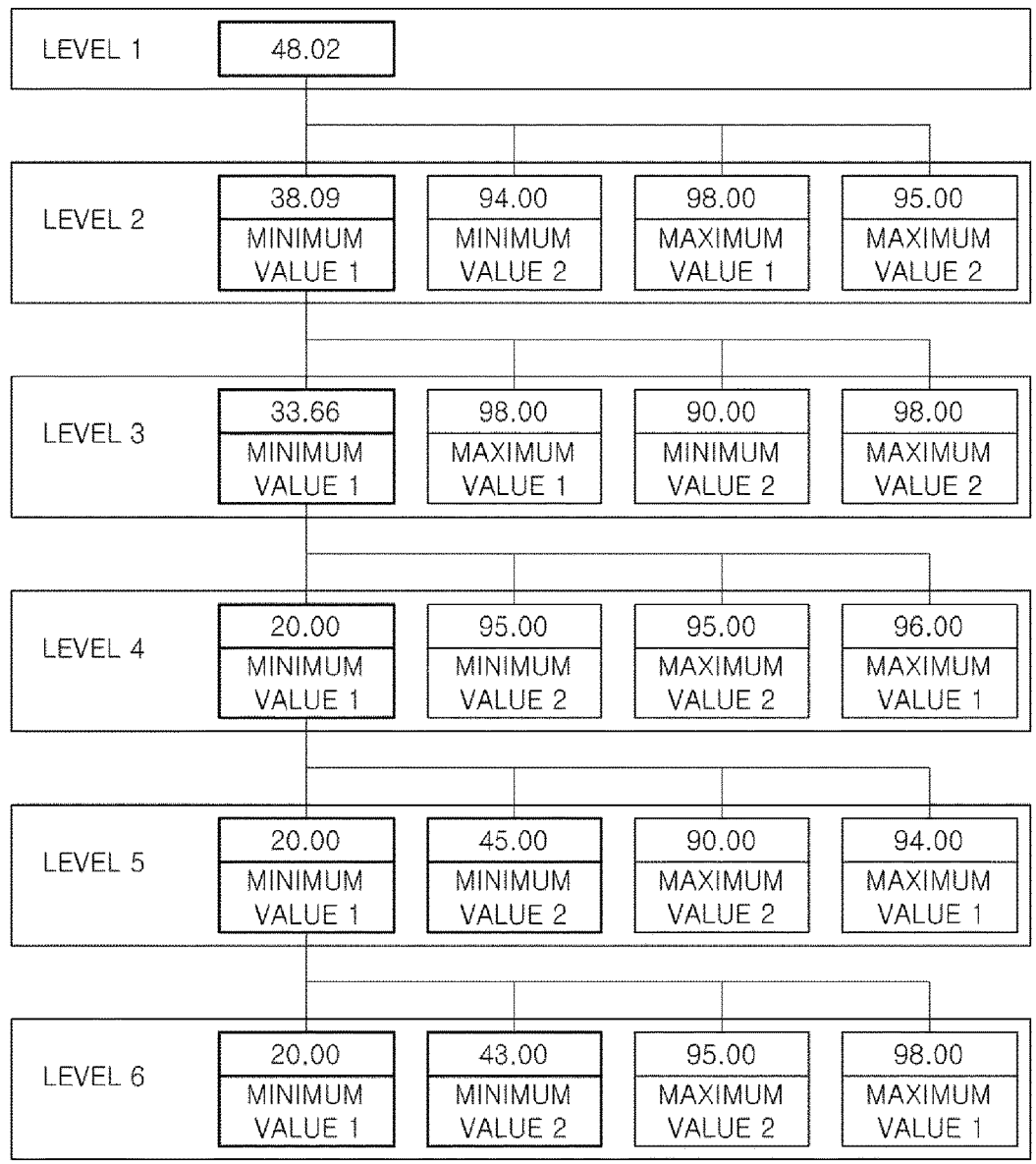
FIG. 6 is a view showing a further example illustrating the system and method for measuring the health index of the plant according to the present invention.

FIG. 6 shows a plant in which another exemplary indices are provided for illustrating the system and method of measuring the health index of a plant in which a condition of each lower level component is reflected according to the present invention.

According to the present invention, the plant 100 has a tree structure having multiple levels from a lowermost level (LEVEL 6) to an uppermost level (LEVEL 1), and each level includes components corresponding to the level. The health index of the lowermost level component is calculated by using the expected value calculated in the expected value calculation processor 210 and actual measurement value based on its past data and an actual measurement value, and indices of upper level components positioned above the lowermost level component is calculated based on the indices of the lowermost level components.

Here, a method of calculating an index of the lowermost level layer, which will be referred to a group index for convenience' sake, based on the indices of the lowermost level components is referred to as a tag index rule, and a method of calculating indices of the upper level layer above the lowermost level layer is referred to as a group index rule.

Figure 7:
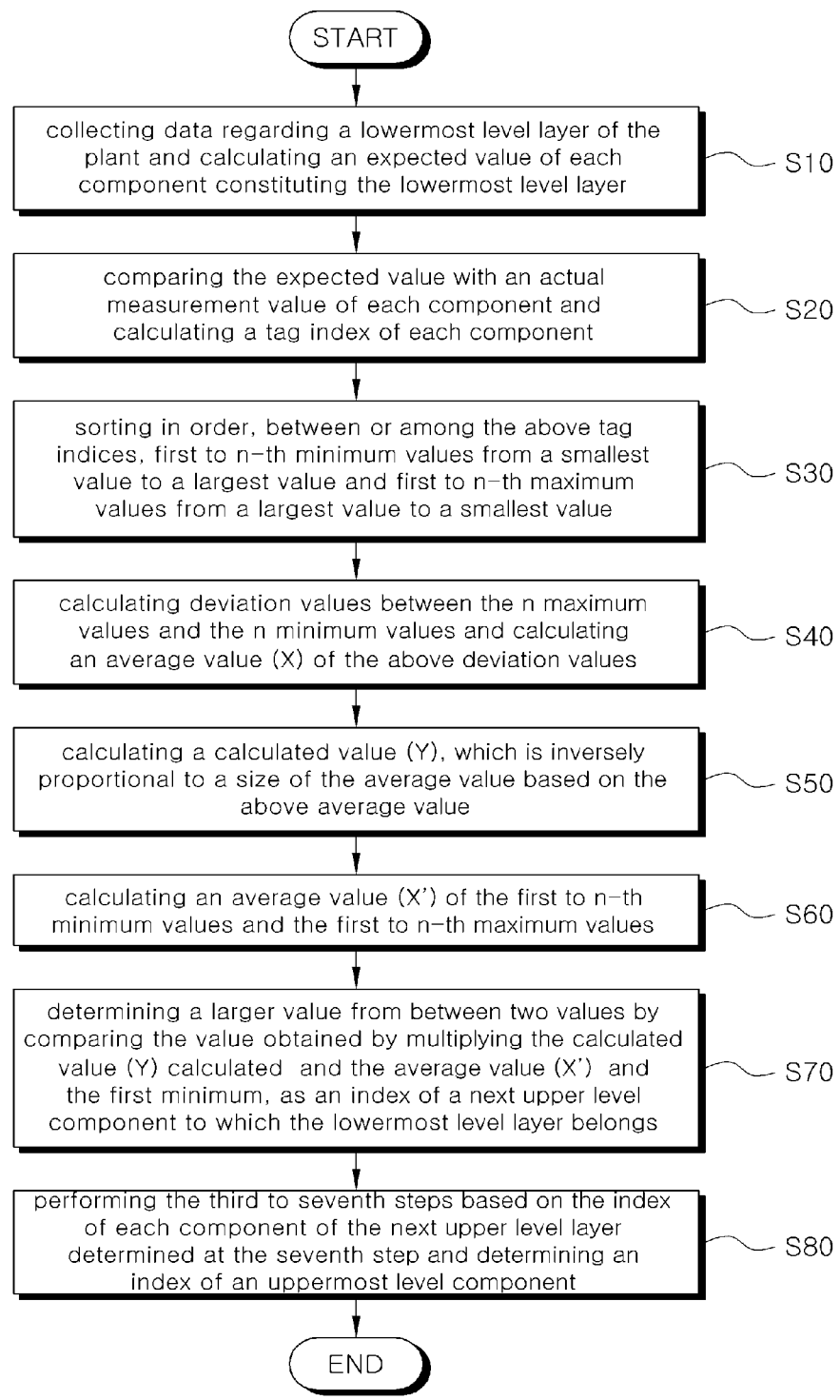
FIG. 7 is a flowchart showing a method for measuring a health index of a plant according to the present invention.

First, the tag index rule will be described hereinafter in reference to FIG. 7.

The data regarding an operation history of the plant 100 can be collected thought sensors 110 and may be stored in the memory 270. For example, data regarded as normal conditions from the operation history of the above plant, specifically data received from components constituting the lowermost level layer in the tree structure, are collected and stored.

In this case, components having a greater influence on an index of the plant may be selected and arranged in the lowermost level layer.

The data collected and stored as described above may be utilized as materials to estimate an actual measurement value of each component constituting the lowermost level layer at a current point of time based on characteristics and an operation history of the relevant component. For example, the expected value calculation processor 210 may calculate an expected value at a current point of time by averaging the collected data (step S10).

Once the expected value is determined by the expected value calculation processor 210, the index value calculation processor 220 calculates a tag index of the corresponding component using an actual measurement value of the relevant component received from the sensor 110 and the expected value.

The tag index may be calculated by [Equation 1] below.

$$\text{Tag index} = 100 + A - \left(\frac{|\text{expected value} - \text{actual measurement value}|}{\text{normal range of an actual measurement value}} \times B\right), \quad [\text{Equation 1}]$$

where A indicates a value to correct a deviation from the normal range of an actual measurement value of each of the components, of which the actual measurement value is changed at a constant amplitude.

The value A may be basically set to zero (0), but it can be adjusted by an administrator for each component or all components uniformly. For example, where an actual measurement value of a specific component is varied with a constant amplitude, an alarm may be sounded although the component is normal when the actual measurement value of the component temporarily deviates from an normal range. In this case, the value A may be adjusted to increase the estimate range, thereby solving the above problem. For example, where a tag index is 80, the tag index can be increased to 90 by setting the value A to 10.

B indicates a value to adjust a reflection rate of the deviation between the expected value and the actual measurement value. As the value B is increased, the reflection rate of the deviation is increased. As the value B is decreased, on the other hand, the reflection rate of the deviation is decreased. The value B is generally set to 100.

An example of tag indices of the lowermost level components determined as described above is shown in FIG. 3. That is, the lowermost level layer (LEVEL 6) may include one or more components and a tag index is calculated for each component. Four components of the lowermost level layer (LEVEL 6) shown in FIG. 4 have tag indices of 99.00, 97.00, 95.00, and 98.00, respectively.

In addition, the tag indices may be multiplied by weights according to the importance of the respective components. The weights can be determined according to the possibilities of trip of the plant by the respective components. For example, a weight of 100% may be applied to a component having a strong possibility of trip. On the other hand, a weight of 50% may be applied to a component having a low possibility of trip (step S20).

Once the tag indices are determined by the index value calculation processor 220, the deviation average calculation processor 230 calculates deviations between the tag indices, and a deviation average value X of the deviations. For this, the tag indices are sorted in the order of first to n-th minimum values, that is, from the smallest value to the largest value. Also, the tag indices are sorted in the order of first to n-th maximum values, that is, from the largest value to the smallest value. Where the lowermost level layer includes four or more components, the tag indices of the respective components are calculated to extract the minimum value and the maximum value.

For example, as shown in FIG. 3, the minimum value of the tag indices is set to minimum value 1 and the second minimum value of the tag indices is set to minimum value 2. In addition, the maximum value of the tag indices is set to maximum value 1 and the second maximum value of the tag indices is set to maximum value 2 (step S30).

Subsequently, respective deviation values between the n maximum values and the n minimum values are calculated and then the deviation average value X is calculated. For example, a deviation value between maximum value 1 and minimum value 1, a deviation value between maximum value 1 and minimum value 2, a deviation value between maximum value 2 and minimum value 1, and a deviation value between maximum value 2 and minimum value 2 are calculated. In case of FIG. 3, therefore, a deviation value between maximum value 1 and minimum value 1 is 4.00, a deviation value between maximum value 1 and minimum value 2 is 2.00, a deviation value between maximum value 2 and minimum value 1 is 3.00, and a deviation value between maximum value 2 and minimum value 2 is 1.00. The deviation average value X is 2.25 (step S40).

Once the deviation average value X is calculated, the correction value calculation processor 240 calculates a correction value Y, which is inversely proportional to the size of the deviation average value X. The correction value Y is provided to compensate a tag index average value X' of the maximum values and the minimum values of the tag indices, which will be calculated below, based on the size of the deviation average value X. If the deviation average value X is large, which means that the deviation between the maximum value and the minimum value is large, the correction value Y is decreased. On the other hand, if the deviation average value X is small, which means that the deviation between the maximum value and the minimum value is small, the correction value Y is increased.

As described above, the correction value Y based on the deviation average value X may be calculated using various methods. In this embodiment, a method defined by Equation 2 may be used.

$$Y = 1.2 - 2\left(\frac{X}{100}\right), \quad 0.1 \le Y \le 1, \quad \text{[Equation 2]}$$

A graph illustrating a relation between the deviation X/100 and the correction value Y is shown in FIG. 4.

As can be seen from [Equation 2] and FIG. 4, the correction value Y has a value between 0 and 1. However, zero (0) has no numerical meaning. According to the present invention, therefore, the correction value Y has a value of 0.1 or more. Consequently, if the deviation X/100 is 0.1 or less, the correction value Y is set to 1. On the other hand, if the deviation X/100 is 0.55 or more, the correction value Y is set to 0.1.

In FIG. 3, the deviation average value X of the deviation values is 2.25. When the value is substituted into [Equation 2], therefore, the correction value Y is set to 1. Actually, the correction value is 1.115, but the correction value Y is 1 or less. Consequently, the final correction value is set to 1 (step S50).

Meanwhile, the tag index average calculation processor 250 calculates a tag index average value X' of the first to n-th minimum values and the first to n-th maximum values. In this embodiment, the tag index average value X' of minimum value 1, minimum value 2, maximum value 1, and maximum value 2. The tag index average value X' is 97.25 (step S60).

Once the correction value Y and the tag index average value X' are determined, the index calculation processor 260 selects a greater one of a first value obtained by multiplying the correction value Y and the tag index average value X' and a second value which is the minimum value of the indices, as an index of the next upper level component to which the lowermost level layer belongs.

In this embodiment, the correction value Y is 1, and the tag index average value X' is 97.25. Consequently, the first value obtained by multiplying the correction value Y and the tag index average value X' is 97.25, and the second value is minimum value 1 (95.00). As a result, the first value of 97.25 is determined as an index of the next upper level component (step S70).

Hereinafter, the group index rule will be described.

The group index rule is basically identical to the tag index rule. That is, an index of the next upper level component is calculated by the group index rule based on the index of the component of the lowermost level layer in the same manner as in the tag index rule.

However, the group index rule is different from the tag index rule in that an index of each component is calculated based on indices of the lower level components in the group index rule, while an index of each component in the tag index rule is calculated based on an expected value and an actual measurement value.

FIG. 3 shows that the indices of each layer are calculated using the above-mentioned method and, finally, an index of the uppermost level component (LEVEL 1) is determined to 95.56. The index of the uppermost level component (LEVEL 1) is used as a health index of each layer of the tree structure shown in FIG. 3 (step S80).

FIG. 5 shows another example for calculating the health index, in which some of the lowermost level components have significantly low values.

As shown in FIG. 5, two components of the lowermost level layer have indices of 50.00 and 43.00, respectively, which are very small. Consequently, the index of 43.00 is determined as minimum value 1 and the index of 50.00 is determined as minimum value 2. In addition, maximum value 1 is 98.00 and maximum value 2 is 95.00.

The deviation average value X of deviation values between the four values is 50.00. The correction value Y is calculated using [Equation 2]. The correction value Y is 0.20.

The tag index average value X' of minimum value 1, minimum value 2, maximum value 1, and maximum value 2 is calculated. The tag index average value X' is 71.50. The product of the correction value Y and the tag index average value X' is 14.3, which is less than the minimum value 1 (43.00). Consequently, the index of a component of the next upper level layer (LEVEL 5) is determined to the minimum value 1, i.e. 43.00.

In the same manner as described above, indices of components of the layers (LEVEL 4 to LEVEL 1) are sequentially calculated. The calculated indices are 51.52, 63.72, 67.95, and 78.94.

In the tree structure shown in FIG. 5, two components of the lowermost level layer (LEVEL 6) have excessively small indices. Although indices of upper level layers are gradually increased as the indices of the upper level layers are calculated, a health index of the uppermost level layer is considerably low. Consequently, it is possible to notice through monitoring of the health index that the indices of the components of the lower level layers would have been excessively lowered.

FIG. 6 shows another example for calculating the health index, in which two components of the lowermost level layer (LEVEL 6) and one component of the next upper level (LEVEL 5) have very small indices.

As shown in FIG. 6, the indices of the lowermost level layer (LEVEL 6) are 20.00, 43.00, 95.00, and 98.00, respectively. Also, minimum value 1 is 20.00, minimum value 2 is 43.00, maximum value 1 is 98.00, and maximum value 2 is 95.00.

An index of a component of the next upper level layer based on the above indices is calculated in the same manner as described above. The calculated index is 20.00. On the other hand, another component of the next upper level layer (LEVEL 5) has an excessively small index of 45.00.

In this state, indices of the next upper level layers (LEVEL 4 to LEVEL 1) are sequentially calculated based on the index of the layer (LEVEL 5). The calculated indices are 20.00, 33.66, 38.09, and 48.02, respectively. As a result, it can be seen that the index, i.e. the health index, of the uppermost level layer is 48.02, which is very small.

Consequently, it is possible for an administrator to notice, through monitoring of the health index of the tree structure, that the indices of the components of the lower level layers are excessively lowered as shown in FIG. 6.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for measuring a health index of a plant, comprising:
a plant having a tree structure and including
a first level layer being a lowest level layer,
a second level layer being a higher level layer than the first level layer,
wherein the first level layer and the second level layer includes one or more components, respectively;
at least one sensor disposed in the plant and configured to collect actual measurement values from the components of the first level layer;
a measuring unit connected to the plant via a wire or wireless communication manner and receiving the actual measurement values from the sensor to calculate the health index, the measuring unit including
a memory storing data including the actual measurement values,
an expected value calculation processor calculating an expected value of each of the components of the first level layer using data in the memory,
an index value calculation processor calculating a tag index of said each of the components of the first level layer by comparing the expected value with an actual measurement value of said each of the components,
a deviation average calculation processor calculating deviation values between the respective components of the first level layer and calculating a deviation average value by averaging the deviation values,
a correction value calculation processor calculating a correction value of said each of the components of the first level layer based on the deviation average value of the components of the first level layer,
a tag index average calculation processor calculating an tag index average value of the components of the first level layer by averaging tag indices of the components of the first level layer,
an index calculation processor calculating an group index of a component of the second level layer to which the first level layer belongs, wherein the group index of the component of the second level layer is determined by selecting a greater one of:
a first value obtained by multiplying the correction value and the tag index average value of the components of the first level layer, and
a second value which is the lowest tag index among the tag indices of the components of the first level layer.

2. The system according to claim 1, wherein the plant further includes a third level layer being a higher level layer than the second level layer, the third level layer including at least one component and the second level layer including a plurality of components, and
wherein the deviation average calculation processor calculates the deviation values between the respective components of the second level layer and calculates the deviation average value by averaging the deviation values,
the correction value calculation processor calculates the correction value of each of the components of the second level layer based on the deviation average value of the components of the second level layer,
the tag index average calculation processor calculates the tag index average value of the components of the second level layer by averaging the tag indices of the components of the second level layer, and
the index calculation processor calculates the group index of a component of the third level layer to which the second level layer belongs, wherein the group index of the component of the third level layer is determined by selecting a greater one of:
a third value obtained by multiplying the correction value and the tag index average value of the components of the second level layer, and
a fourth value being the lowest tag index among the tag indices of the components of the second level layer.

3. The system according to claim 1, wherein the tag index is calculated by an equation of $$\text{Tag index} = 100 + A - \left( \frac{|\text{expected value} - \text{actual measurement value}|}{\text{normal range of an actual measurement value}} \times B \right).$$

wherein A is a value to correct the deviation from the normal range of the actual measurement value of said each of the components, and B is a value to adjust the reflection rate of the deviation between the expected value and the actual measurement value.

4. The system according to claim 1, wherein the correction value is calculated by an equation of $$Y = 1.2 - 2\left(\frac{X}{100}\right), \quad 0.1 \le Y \le 1,$$

wherein X is the average deviation value of the deviation values, and Y is the correction value.

5. The system according to claim 1, wherein the tag index is multiplied by a weight, and the weight is determined based on a possibility of trip of the plant by a corresponding component.

6. A method of measuring a health index of a plant, the plant having a tree structure and including
a first level layer being a lowest level layer,
a second level layer being a higher level layer than the first level layer,
wherein the first level layer and the second level layer includes one or more components, respectively, and
the plant being connected with a measuring unit via a wire or wireless communication manner,
the method comprising:
collecting actual measurement values from the components of the first level layer by at least one sensor disposed in the plant;
receiving the actual measurement values from the sensor by a measuring unit;
calculating an expected value of each of the components of the first level layer, by an expected value calculation processor, using data stored in a memory, the data including the actual measurement values;
calculating a tag index of said each of the components of the first level layer, by an index value calculation processor, by comparing the expected value with an actual measurement value of said each of the components;
calculating, by a deviation average calculation processor, deviation values between the respective components of the first level layer and calculating, by the deviation average calculation processor, an deviation average value by averaging the deviation values;

calculating, by a correction value calculation processor, a correction value of said each of the components of the first level layer based on the deviation average value of the components of the first level layer;

calculating, by a tag index average calculation processor, an tag index average value of the components of the first level layer by averaging tag indices of the components of the first level layer;

calculating, by an index calculation processor, an group index of a component of the second level layer to which the first level layer belongs, wherein the group index of the component of the second level layer is determined by selecting a greater one of:
- a first value obtained by multiplying the correction value and the tag index average value of the components of the first level layer, and
- a second value which is the lowest tag index among the tag indices of the components of the first level layer.

7. The method according to claim 6, wherein the plant further includes a third level layer being a higher level layer than the second level layer, the third level layer including at least one component and the second level layer including a plurality of components, the method further comprises:
calculating, by the deviation average calculation processor, the deviation values between the respective components of the second level layer and calculating the deviation average value by averaging the deviation values;

calculating, by the correction value calculation processor, the correction value of said each of the components of the second level layer based on the deviation average value of the components of the second level layer;

calculating, by the tag index average calculation processor, the tag index average value of the components of the second level layer by averaging the tag indices of the components of the second level layer; and calculating, by the index calculation processor, the group index of a component of the third level layer to which the second level layer belongs, wherein the group index of the component of the third level layer is determined by selecting a greater one of:
- a third value obtained by multiplying the correction value and the tag index average value of the components of the second level layer, and
- a fourth value being the lowest tag index among the tag indices of the components of the second level layer.

8. The method according to claim 6, wherein the tag index is calculated by an equation of $$\text{Tag index} = 100 + A - \left( \frac{|\text{expected value} - \text{actual measurement value}|}{\text{normal range of an actual measurement value}} \times B \right)$$

wherein A is a value to correct the deviation from the normal range of the actual measurement value of said each of the components, and B is a value to adjust the reflection rate of the deviation between the expected value and the actual measurement value.

9. The method according to claim 6, wherein the correction value is calculated by an equation of $$Y = 1.2 - 2\left(\frac{X}{100}\right), \quad 0.1 \le Y \le 1,$$

wherein X is the average deviation value of the deviation values, and Y is the correction value.

10. The method according to claim 6, wherein the tag index is multiplied by a weight, and the weight is determined based on a possibility of trip of the plant by a corresponding component.

* * * * *